Jan. 20. 1925.                                                        1,523,963
                              A. F. HODGSON
                      UNCAPPING DEVICE FOR HONEYCOMBS
                          Filed Dec. 22, 1923        2 Sheets-Sheet 1

Inventor
Arthur F. Hodgson

Jan. 20, 1925.     A. F. HODGSON     1,523,963
UNCAPPING DEVICE FOR HONEYCOMBS
Filed Dec. 22, 1923     2 Sheets-Sheet 2
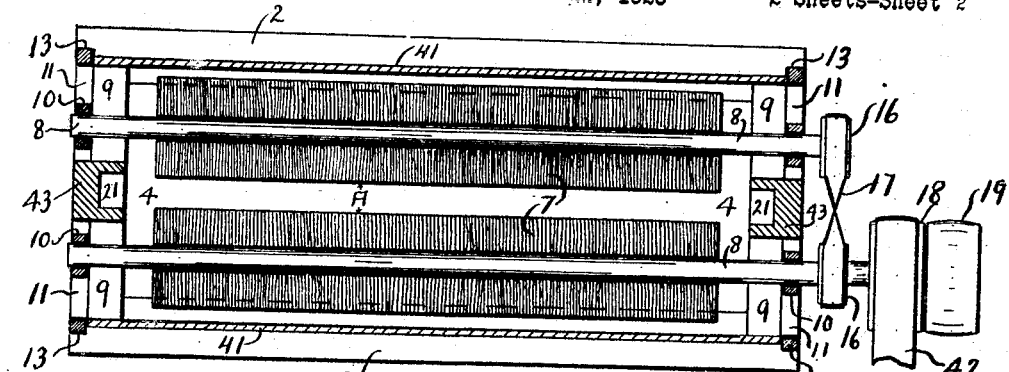
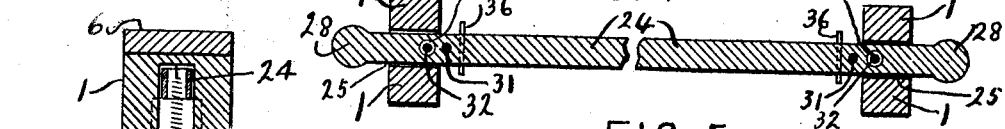
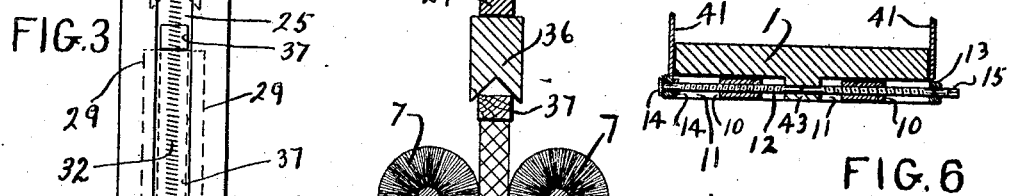
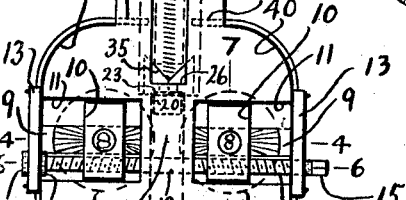
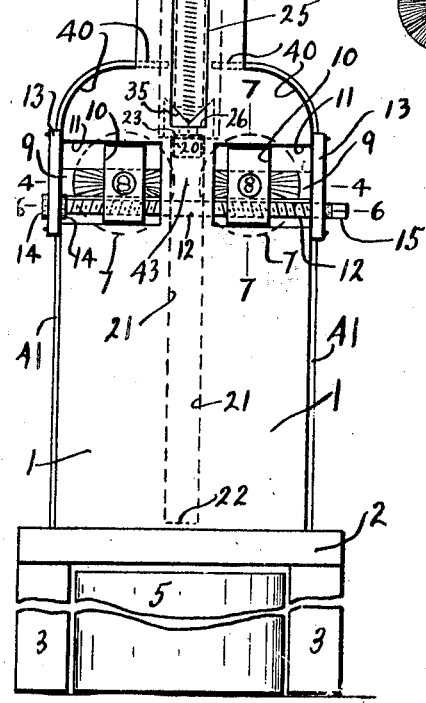
Inventor
Arthur F. Hodgson Patented Jan. 20, 1925.

1,523,963

UNITED STATES PATENT OFFICE.

ARTHUR F. HODGSON, OF JARVIS, CANADA.

UNCAPPING DEVICE FOR HONEYCOMBS.

Application filed December 22, 1923. Serial No. 682,200.

*To all whom it may concern:*

Be it known that I, ARTHUR F. HODGSON, a subject of the King of Great Britain, and a resident of the village of Jarvis, in the county of Haldimand, Province of Ontario, Dominion of Canada, have invented certain new and useful Improvements in Uncapping Devices for Honeycombs, of which the following is the specification.

My invention relates to improvements in uncapping devices for honeycombs, and the objects of the invention are to simplify and expedite the operation of uncapping honeycombs; to provide for the uncapping of both sides of the comb simultaneously; to eliminate the use of uncapping knives, both of the hand and machine types; and to reduce the liability of damaging the comb during uncapping. Other objects will appear in the following specification.

My invention consists essentially of an uncapping device for honeycombs comprising rotatable, abrasive, cap removing means, together with means for feeding a comb past said rotating means, whereby the capping is removed, all as hereinafter more particularly described and illustrated in the accompanying drawings in which:—

Fig. 3 is an end elevation thereof, a portion at the top being shown in section on the line 3, 3 of Fig. 1.

Fig. 4 is a horizontal section on the line 4, 4, of Figs. 1 and 3.

Fig. 5 is a horizontal section on the line 5, 5 of Fig. 1, being broken away intermediately to economize space.

Fig. 6 is a fragmentary horizontal section of one end of the device taken on the line 6, 6 of Fig. 3.

Fig. 7 is a fragmentary vertical section of one end of the device taken on the line 7, 7 of Fig. 3.

Fig. 8 is a transverse vertical section illustrating the manner in which the honeycomb is supported in the device and fed between rotatable brushes.

Like characters of reference indicate corresponding parts in the different views.

Figure 2:
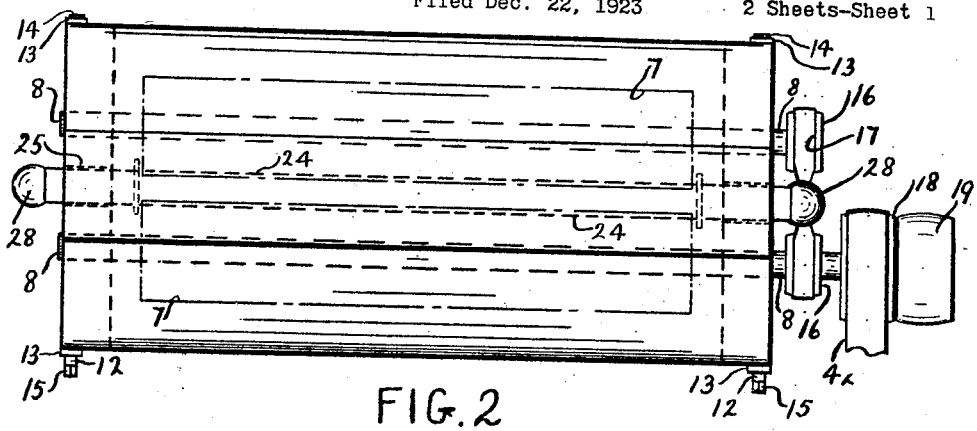
Fig. 2 is a plan view thereof.

My invention comprises a main frame having the end uprights 1, supported upon a base 2, which in turn is carried by the legs 3.

The base 2 has a central opening 4, the purpose of which will presently appear.

Underneath the opening 4 in the base is placed a suitable removable receptacle 5.

Connecting the upper ends of the end uprights 1 is a top frame member 6.

7 are two wire brushes carried upon shafts 8.

These shafts are horizontal and parallel and extend through transverse openings 9 extending inwardly from the sides of the end frame members 1.

The inner ends of these slots are separated by a solid portion 43 of the frame members.

The shafts are journalled in blocks 10 which are slidably mounted in horizontal guide slots 11 formed in the outer faces of the frame members 1.

12 are transverse adjusting spindles having right and left hand threaded engagement with the bearing blocks 10 and are journalled at their ends in brackets 13, which brackets are secured to the edges of the frame members 1.

The spindles are secured against axial movement by collars 14 (see Figs. 3 and 6) secured at one end thereof while the other end is squared at 15 to receive a suitable adjusting wrench.

The shafts 8 at one end of the device carry pulleys 16 which are connected by a crossed belt 17.

One of the shafts 8 extends outwardly beyond its pulley 16 and carries fast and loose pulleys 18 and 19, with which is associated a main drive belt 42.

20 is a carriage extending centrally and longitudinally of the device and is slidably mounted in vertical guide slots 21 in the inner faces of the end frame members 1.

These slots 21 extend upwardly from a point 22 adjacent to the base 2 to a point 23 slightly above the shafts 8 and the ends of these slots form stops for limiting the travel of the carriage 20.

24 is a crosshead slidably mounted in vertical guide slots 25 situated centrally of the end frame members 1.

The slots 25 extend downwardly to a point 26 situated slightly above the top 23 of the slot 21 and upwardly to a point 27 adjacent to the top of the end frame members 1.

The bottom of the slot 26 forms a stop limiting the downward travel of the crosshead while the upper end 27 forms a stop limiting the upward travel thereof.

The crosshead 24 carries handles 28 extending beyond the end frame members 1.

The carriage 20 is fitted with upwardly extending vertical bearing strips 29 which contact with the inner faces of the end frame members 1 and constitute means for preventing the carriage from tilting endwise in its guide.

30 are vertical rods extending upwardly from the tops of the bearing strips 29 and pass freely through small orifices in the crosshead 24.

31 are compression springs mounted upon the rods 30 between the strips 29 and the crosshead 24.

32 are tension coil springs having their lower ends secured to the ends of the carriage 20 and their upper ends secured to the frame at the top of the slot 25.

These springs lie within the slots 25 and pass freely through orifices 33 in the end frame members and 34 in the crosshead.

Figure 1:
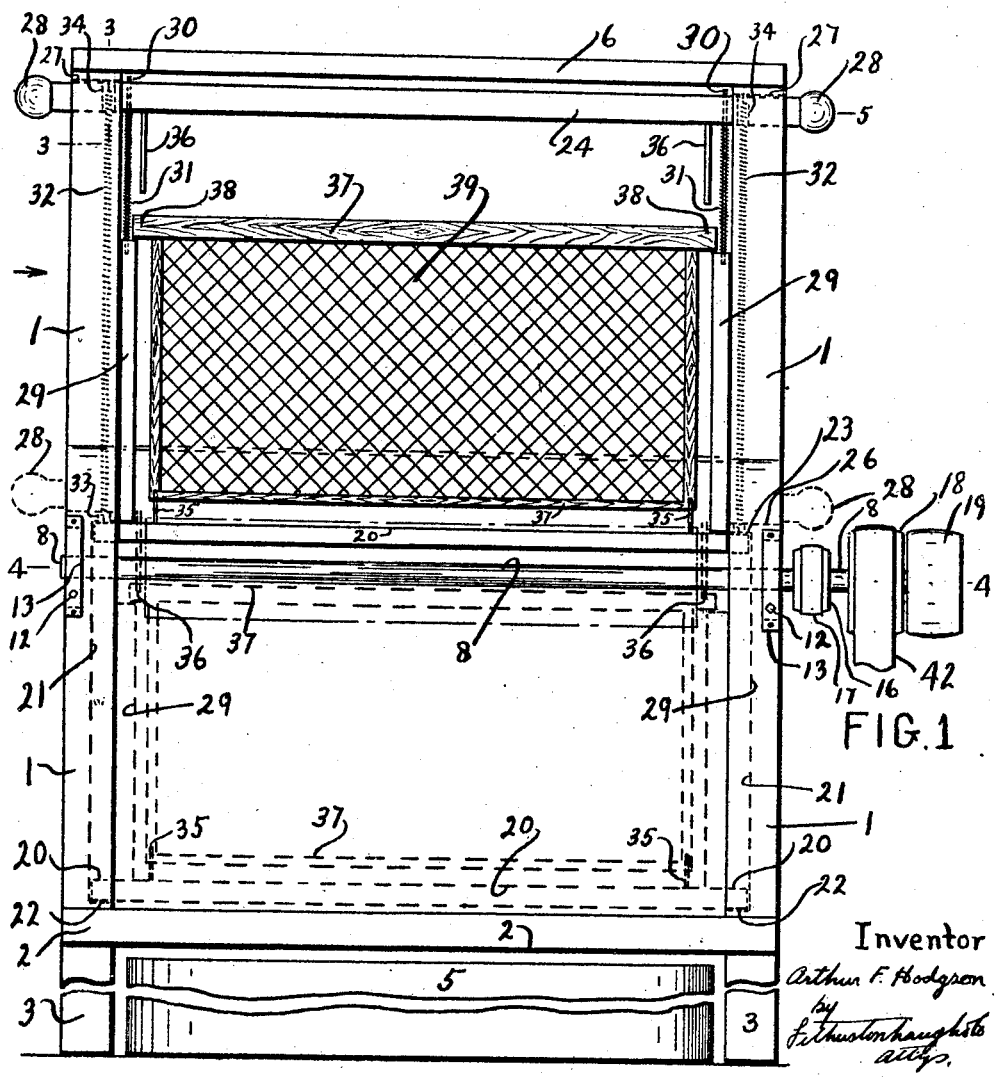
Fig. 1 is a side elevation of an uncapping device embodying my invention.

It will thus be seen that they constitute spring means normally maintaining the carriage at the upper end of its travel in the position illustrated in full lines in Fig. 1.

35 are upwardly directed V-blocks carried by the upper side of the carriage 20 and 36 are downwardly directed V-blocks carried by the under side of the crosshead 24.

37 is the wooden frame of a honeycomb within which is contained the cellular portion 39 of the comb.

The top member of the frame 37 extends outwardly beyond the body of the frame at 38.

The height of the bearing strips 29 is such that when a comb is inserted within the machine so that the bottom thereof rests upon the V-blocks 35, the projecting portions 38 of the frame rest upon the tops of these bearing strips (see Fig. 1).

The bottom portion of the end frame members 1 is of sufficient width to extend laterally beyond the brushes 7.

This width continues upwardly to a point above the brushes and the frame members 1 are then curved inwardly at 40 (see Fig. 3) after which they continue upwardly at a reduced width.

41 are cover plates which are secured to the sides of the frame members 1 and totally encase the lower portion of the machine to a point above the brushes. The purpose of these will presently appear.

The construction and operation of my invention is as follows:

The brushes 7 will preferably be of the wire bristle type and will be of cylindrical form and will constitute opposed, parallel, spaced apart, abrasive, elements. The space between the brushes is indicated at "A" in Fig. 4.

Since the pulleys 16 are connected by a crossed belt 17 it will be apparent that when the main drive belt 42 is connected with the fast pulley 18 that the two shafts 8, and therefore the brushes 7 carried thereby, will be rotated in opposite directions.

Consider the parts to be in the position illustrated in full lines in Fig. 1 with the carriage 20 in its normal position at the top of its travel.

The manner in which the machine operates to uncap the comb is as follows:

The frame 37 with the capped comb portion 39 is inserted. In this operation the lower portion of the frame 37 engages within the V-blocks 35 carried by the carriage (see Figs. 1 and 8) and the projecting portions 38 at the top of the frame rest upon the tops of the strips 29. In this normal position, the springs 31 maintain the crosshead 24 raised at a distance above the top of the comb so as not to interfere with the placing of the comb in position. This position is illustrated in full lines in Fig. 1.

The crosshead 24 is now depressed by hand so that the upper V-blocks 36 engage the top member of the frame 37 (see Fig. 8).

It will therefore be noted that the lower and upper V-blocks 35 and 36 constitute means for properly centering the comb within the machine, it being understood that these V-blocks are located centrally of the branches 7.

These V-blocks also provide a positive and certain means of holding the comb perfectly steady and rigid within the machine.

To uncap the comb the brushes 7 are rotated by connecting the belt 42 with the fast pulley 18, and the carriage 20 with the comb supported therein is passed downwardly between the brushes. This is done manually by depressing the handles 28 carried by the crosshead 24.

During this passage of the comb between the brushes the peripheries of the brushes contact respectively with the cappings on either side of the comb and very efficiently remove these cappings.

In order to provide adjustment laterally for the brushes to exactly suit the thickness of the comb, the bearing blocks 10 in which the shafts 8 are journalled may be adjusted by means of the threaded spindles 12.

These spindles provide means for adjusting the shafts 8 in parallelism towards and away from each other.

The manner in which the comb is supported between the carriage 20 and the crosshead 24 and the manner in which the brushes engage the comb to remove the capping therefrom will be clear from Fig. 8.

The position of the carriage 0, handles 28 and comb, when at the bottom of their travel after having passed between the brushes, is illustrated in broken lines in Fig. 1.

After depressing the carriage and passing the comb between the brushes the handles 28 are released and the springs 32 immediately draw the carriage upwardly into its normal position.

When this is reached the springs 31 raise the crosshead further to release the engagement between the V-blocks 36 and the frame 37 so as to permit removal of the comb from the device.

During the operation it is essential that the comb be firmly supported and that it be positioned exactly centrally between the brushes.

These two objects are both effectively accomplished by the V-blocks 35 and 36.

During the uncapping operation the cappings and material thrown off by the brushes fall through the opening 4 in the base and are caught in the receptacle 5.

The lower portion of the machine is encased by the sheets 41 in order to catch all material thrown by centrifugal force from the rotating brushes 7.

It is essential that in the uncapping of combs the comb cells must not be damaged since after the extraction of the honey therefrom the wax cellular structure is used over and over again.

Hitherto the uncapping of combs has been done almost entirely by severing the capping from the comb with a hand operated knife. This has been a slow and tedious operation and has required expert manipulation if the comb was not to be damaged.

A further disadvantage in the use of a knife is that the pollen stored in some of the cells by the bees is extremely hard and when the knife strikes this lump of pollen it adheres to the cutting edge and forms an obstruction, which upon further penetration of the blade mutilates the comb.

This weakness is present in all uncapping devices employing a sharp cutting edge whether they be manually operated or are in the form of a machine.

It has been found that the uncapping by a hand knife is extremely difficult, if the knife is cold, and therefore the blades of uncapping knives are steam heated. This involves the use of steam tubes being connected to the knife, which tubes are a source of constant trouble and inconvenience.

A further disadvantage of the steam heated blade is that the condensate gets into the honey causing the presence of water.

A further disadvantage of the hand knife is that the two sides of the comb must be uncapped separately.

It has been with a view of overcoming these disadvantages present in the former practice that my invention has been devised and from the foregoing it will be evident that I have devised valuable improvements in uncapping devices which will greatly expedite and simplify this operation.

With my device both sides of the comb may be uncapped simultaneously and the uncapping can be effected without any danger of damaging the cellular structure of the comb.

While I have illustrated and described a specific embodiment of my invention, various modifications may be made therein without departing from the spirit of the invention or the scope of the claims and therefore the exact form shown is to be taken as illustrative only and not in a limiting sense.

For instance while in the drawings the brushes 7 have been shown as horizontal with the comb passing vertically therebetween, I wish it to be understood that other relative dispositions of the brushes and carriage are to be considered as falling within my present invention.

For instance cases in which the brushes might be vertically disposed with the comb travelling horizontally therebetween.

Also various obvious alternative methods may be substituted for raising the carriage 20 in the crosshead 24.

What I claim as my invention is:

1. An uncapping device for honeycombs comprising rotatable cap removing means.

2. An uncapping device for honeycombs comprising spaced apart, opposed, rotatable cap removing means.

3. An uncapping device for honeycombs comprising spaced apart, opposed, rotatable cap removing means, and means for adjusting said cap removing means towards and away from each other.

4. An uncapping device for honeycombs comprising spaced apart, parallel, rotatable cap removing means.

5. An uncapping device for honeycombs comprising opposed, spaced apart, rotatable, abrasive elements, and means for guiding a honeycomb therebetween.

6. An uncapping device for honeycombs comprising opposed, spaced apart abrasive elements rotatable about parallel axes, means for guiding a honeycomb therebetween, and means for adjusting the abrasive elements in parallelism towards and away from each other.

7. An uncapping device for honeycombs comprising rotatable cap removing means, comb supporting means, and means for contacting the former with the surface of the latter.

8. An uncapping device for honeycombs comprising opposed, spaced apart, cylindrical, abrasive elements rotatable about parallel axes, and means for guiding a honeycomb centrally therebetween.

9. An uncapping device for honeycombs comprising a main frame, opposed, spaced apart brushes mounted therein, and rotatable about parallel axes, means for supporting a honeycomb vertically, and means for relatively guiding the comb centrally between the brushes.

10. An uncapping device for honeycombs comprising a main frame, opposed, spaced apart brushes mounted therein and rotatable about parallel horizontal axes, means for supporting a honeycomb vertically, and means for relatively guiding the comb centrally between the brushes.

11. An uncapping device for honeycombs comprising a main frame, opposed, spaced apart brushes mounted therein and rotatable about parallel axes, a comb supporting carriage, slidable within the main frame and adapted to support a honeycomb, centrally between the aforesaid brushes, and means for guiding the carriage in the main frame to feed the comb between the brushes.

12. An uncapping device for honeycombs comprising a main frame, opposed, spaced apart brushes mounted therein and rotatable about parallel axes, a comb supporting carriage slidable within the main frame and adapted to support a honeycomb centrally between the aforesaid brushes, the plane of the comb being perpendicular to the plane containing the axes of rotation of said opposed brushes, means for adjusting the brushes in parallelism towards and away from each other, and means for guiding the carriage in the main frame to feed the comb between the brushes.

13. An uncapping device for honeycombs comprising a main frame, opposed, spaced apart brushes mounted therein and rotatable about horizontal axes, a comb supporting carriage slidable vertically within the main frame and adapted to vertically support a honeycomb centrally between the aforesaid brushes, and means for sliding the carriage in the main frame to feed the comb between the brushes.

14. An uncapping device for honeycombs comprising a main frame, opposed, spaced apart brushes mounted therein and rotatable about parallel horizontal axes, a carriage slidable vertically in the main frame, spring means normally maintaining said carriage in its topmost position, comb engaging means carried by the carriage and adapted to support a comb vertically and centrally above the brushes, and means for moving the carriage and comb downwardly to pass the comb between the brushes.

15. An uncapping device for honeycombs comprising a main frame, opposed, spaced apart brushes mounted therein and rotatable about parallel horizontal axes. a carriage slidable vertically in the main frame, spring means normally maintaining said carriage in its topmost position, a horizontal crosshead slidable in vertical guides in the main frame and located vertically above the carriage, upwardly directed comb engaging V-blocks carried by the carriage, downwardly directed comb engaging V-blocks carried by the handle, the V-blocks on the crosshead and carriage co-acting to support a comb vertically and to position said comb centrally between the brushes as the crosshead and carriage are moved downwardly to pass the comb between the brushes.

16. An uncapping device for honeycombs comprising a main frame, opposed, spaced apart brushes mounted therein and rotatable about parallel horizontal axes, a carriage slidable vertically in the main frame, spring means normally maintaining said carriage in its topmost position, a horizontal crosshead slidable in vertical guides in the main frame and located vertically above the carriage, upwardly directed comb engaging V-blocks carried by the carriage, downwardly directed comb engaging V-blocks carried by the handle, spring means co-acting between the carriage and crosshead for normally maintaining the upper and lower V-blocks separated by a distance greater than the height of a comb, the V-blocks on the crosshead and carriage co-acting to support a comb therebetween vertically and to position said comb centrally between the brushes as the crosshead and carriage are moved downwardly to pass the comb between the brushes.

ARTHUR F. HODGSON.

Witnesses:
   JOHN G. HAYWARD,
   NORIUN COLES.